(12) United States Patent
Iida

(10) Patent No.: US 6,945,231 B2
(45) Date of Patent: Sep. 20, 2005

(54) FUEL GAS MIXER

(75) Inventor: Yoshikatsu Iida, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 106 days.

(21) Appl. No.: 10/149,895

(22) PCT Filed: Oct. 12, 2001

(86) PCT No.: PCT/JP01/08988

§ 371 (c)(1),
(2), (4) Date: Nov. 20, 2002

(87) PCT Pub. No.: WO02/31337

PCT Pub. Date: Apr. 18, 2002

(65) Prior Publication Data

US 2003/0111063 A1 Jun. 19, 2003

(30) Foreign Application Priority Data

Oct. 12, 2000 (JP) .......................... 2000-312048

(51) Int. Cl.[7] .............................................. F02M 21/04
(52) U.S. Cl. ....................................... 123/442; 123/527
(58) Field of Search ................................ 123/527, 336, 123/442

(56) References Cited

U.S. PATENT DOCUMENTS

| | | | |
|---|---|---|---|
| 4,391,249 A | * | 7/1983 | Bianchi et al. ............. 123/438 |
| 5,251,602 A | | 10/1993 | Kurihara et al. |
| 5,337,722 A | | 8/1994 | Kurihara et al. |
| 5,529,048 A | | 6/1996 | Kurihara et al. |
| 5,546,919 A | | 8/1996 | Iida et al. |
| 5,575,266 A | | 11/1996 | Iida |
| 5,827,455 A | | 10/1998 | Nakai |
| 5,885,122 A | | 3/1999 | Fujimoto |
| 5,921,217 A | | 7/1999 | Koike et al. |
| 5,921,225 A | | 7/1999 | Nakamura |

FOREIGN PATENT DOCUMENTS

| | | |
|---|---|---|
| DE | 43 23 969 A1 | 1/1994 |
| EP | 0 678 662 A2 | 10/1995 |
| EP | 0 510 585 B1 | 7/1999 |
| EP | 0 575 939 B1 | 9/1999 |
| EP | 0 640 757 B1 | 11/1999 |
| EP | 0 640 756 B1 | 12/1999 |
| JP | 03116991 | 4/1991 |
| JP | 03116992 | 4/1991 |
| JP | 03116993 | 4/1991 |
| JP | 05216379 | 8/1993 |
| JP | 07-189812 | 7/1995 |
| JP | 11192860 | 7/1999 |
| RU | 1444551 | 12/1988 |

* cited by examiner

*Primary Examiner*—Andrew M. Dolinar
*Assistant Examiner*—Katrina Harris
(74) *Attorney, Agent, or Firm*—Knobbe, Martens, Olson & Bear, LLP

(57) ABSTRACT

In a fuel gas mixer 1 including a throttle valve 4 provided in an air intake passage 2 connected to an engine for opening and closing the air intake passage 2 and a fuel gas supply passage 6 connected to the air intake passage 2 upstream of the throttle valve 4. A fuel gas control valve 5 is provided in the air intake passage 2 upstream of the connecting part of the fuel gas supply passage 6 for opening and closing the air intake passage 2, and a fuel gas control value controlling means 11 is provided for varying the degree of the opening of the fuel gas control value 5 depending upon the operating state of the engine.

6 Claims, 15 Drawing Sheets

Basic A/F map
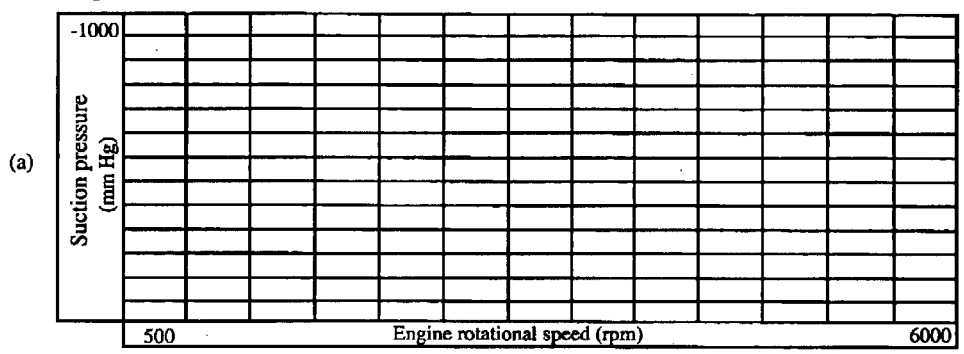
Start table
(b) | Water temp |
    | Opening |
Idle table
(c) | Water temp |
    | Opening |
Deceleration fuel cutoff table
(d) | Engine rotational speed |
    | Opening |
A/F feedback map
Rich side speed (e)
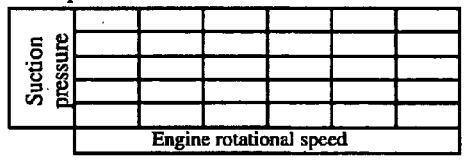
Lean side speed (g)
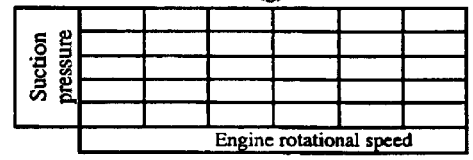
Rich side opening (f)
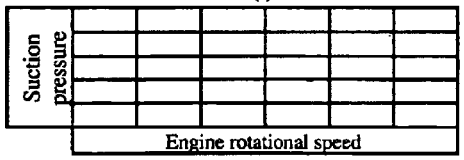
Lean side opening (h)
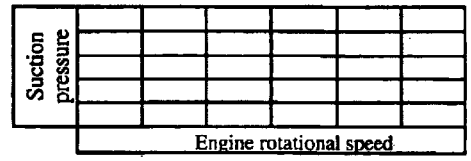
*Figure 7*

FUEL GAS MIXER

RELATED CASES

This application is a national phase filing under 35 U.S.C. § 371 of PCT Application No. PCT/JP01/08988, filed Oct. 12, 2001, which claims priority to Japanese Application No. 2000-312048, filed Oct. 12, 2000.

BACKGROUND OF THE INVENTION

1. Field of the Invention

The present invention relates to a fuel gas mixer for use in an engine using a fuel gas such as LPG or natural gas as its fuel.

2. Description of the Related Art

One conventional fuel gas mixer is a fixed venturi type mixer generally having a structure shown in FIG. 13. A throttle valve 32 is provided in an air intake passage 31 connected to an engine for opening and closing the air intake passage 31. A main venturi 33 is formed upstream of the throttle valve 32. A main fuel gas passage 34 is connected to the main venturi 33 and a flow control valve 36 driven by a step motor 35 is provided in the main fuel gas passage 34. A gas injector 37 is provided close to and downstream of the throttle valve 32.

In a low-load operation range, the opening of the throttle valve 32 is small and a suction (negative) pressure is hardly created at the main venturi 33. Thus, high-pressure fuel gas is injected from the gas injector 37 and the air-fuel ratio is controlled by adjusting the injection time.

In an intermediate- or high-load operation range, the opening of the throttle valve 32 is large and a suction (negative) pressure is created at the main venturi 33. Thus, the air-fuel ratio is controlled by adjusting the cross-sectional area of the main fuel gas passage 34 with the step motor 35.

In the case of the fixed venturi type mixer, the venturi diameter (passage diameter) is limited by the flow rate characteristic of the gas injector 37 and thus has a low degree of design freedom. Namely, in order to prevent a range where the air-fuel ratio is low from being generated between an operation range where the fuel is supplied from the gas injector 37 and an operation range where the fuel is supplied from the main venturi part, the fuel must start to be supplied from the main venturi part when the flow rate of the gas injector 37 gets close to the maximum. Thus, the venturi diameter is limited by the flow rate characteristic of the injector 37.

As a result, in order to enlarge the main venturi diameter so as to be suitable for a large-displacement engine or a high-power engine, a plurality of injectors are needed, resulting in an increase in costs.

Additionally, it is necessary to control air-fuel ratios of the two systems: a main system for supplying fuel from the main venturi part and a slow system for supplying fuel from the gas injector. This makes the control system complicated and increases costs.

The present invention has been made in view of the above problems of the prior art. An aspect of the present invention thus involves a fuel gas mixer that does not use a main venturi and a gas injector and, consequently, is simple in structure and is less expensive. The present fuel gas mixer also is applicable to a variety of engine sizes, from a small-displacement engine to a large-displacement engine.

SUMMARY OF THE INVENTION

Claim 1 recites a fuel gas mixer comprising an air intake passage connected to an engine, a throttle valve provided in the air intake passage for opening and closing the air intake passage, and a fuel gas supply passage connected to the air intake passage at a position upstream of the throttle valve, characterized in that a fuel gas control valve for opening and closing the air intake passage is provided in the air intake passage at a position upstream of the position at which the fuel gas supply passage is connected to the air intake passage and in the fuel gas control valve controlling means is provided for varying the opening degree of the fuel gas control valve according to the operating state of the engine.

Claim 2 recites a fuel gas mixer according to Claim 1, characterized in that the gas control valve controlling means comprises a link mechanism connecting the fuel gas control valve to the throttle valve, and the link mechanism is adapted to fully open the fuel gas control valve before the throttle valve is fully opened.

Claim 3 recites a fuel gas mixer according to Claim 2, characterized in that an air passage is connected partway along the fuel gas supply passage, in which the amount of fuel gas to be supplied is controlled by controlling the cross-sectional area of the air passage.

Claim 4 recites a fuel gas mixer according to Claim 1, characterized in that the fuel gas control valve controlling mean comprises a step motor for opening and closing the fuel gas control valve.

Claim 5 recites a fuel gas mixer according to Claim 4, charaterized in that the amount of the fuel gas to be supplied is controlled by controlling the opening of the fuel gas control valve in at least a low-load operation range.

BRIEF DESCRIPTION OF THE DRAWINGS

FIG. 7 includes maps for explaining operations of the mixer;

DETAILED DESCRIPTION OF THE PREFERRED EMBODIMENT

The embodiments of the present invention will be hereinafter described with reference to accompanying drawings.

Figure 1:
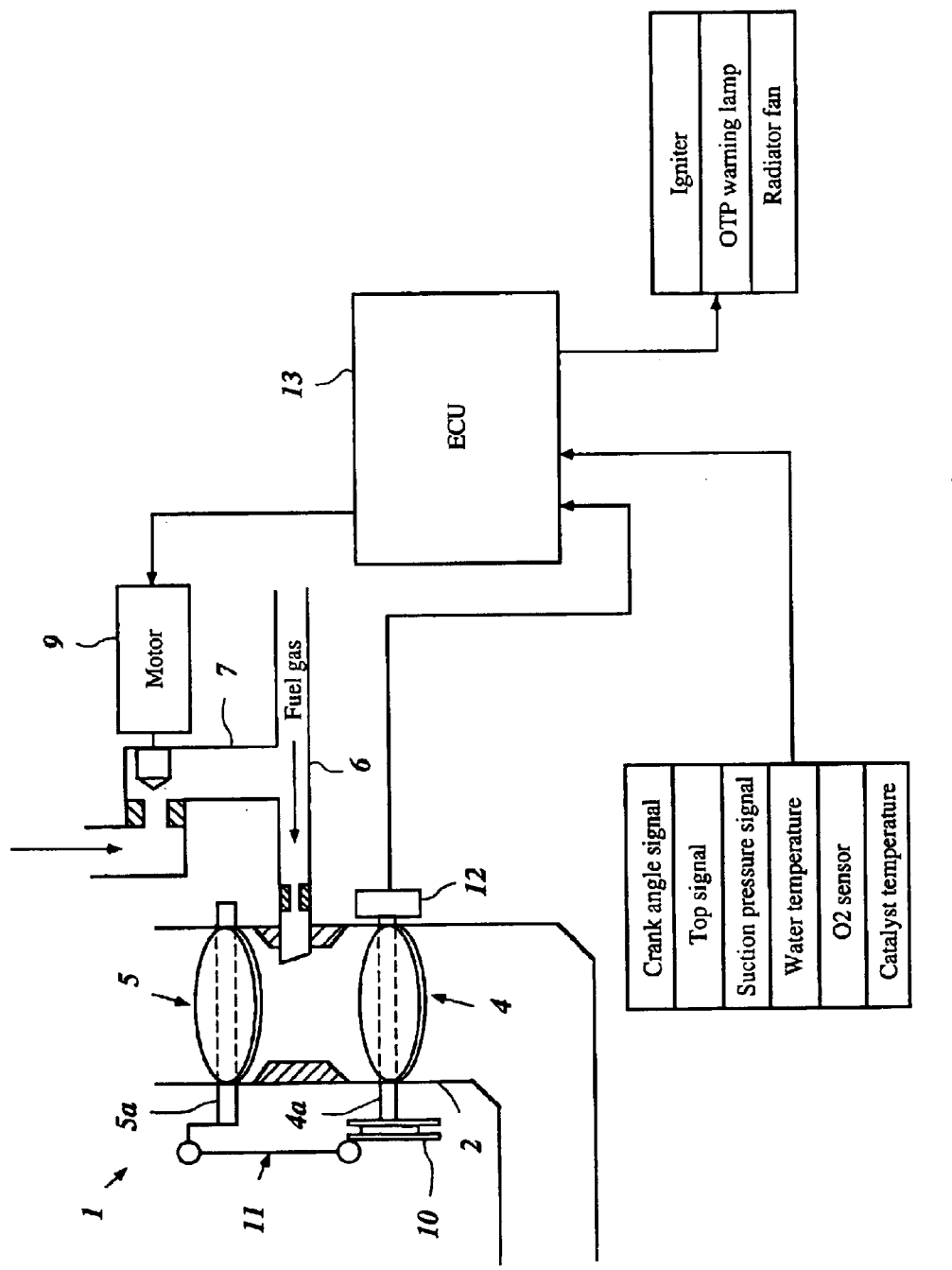
FIG. 1 is a schematic structural view of a system of a fuel gas mixer according to one embodiment of the present invention.
Figure 2:
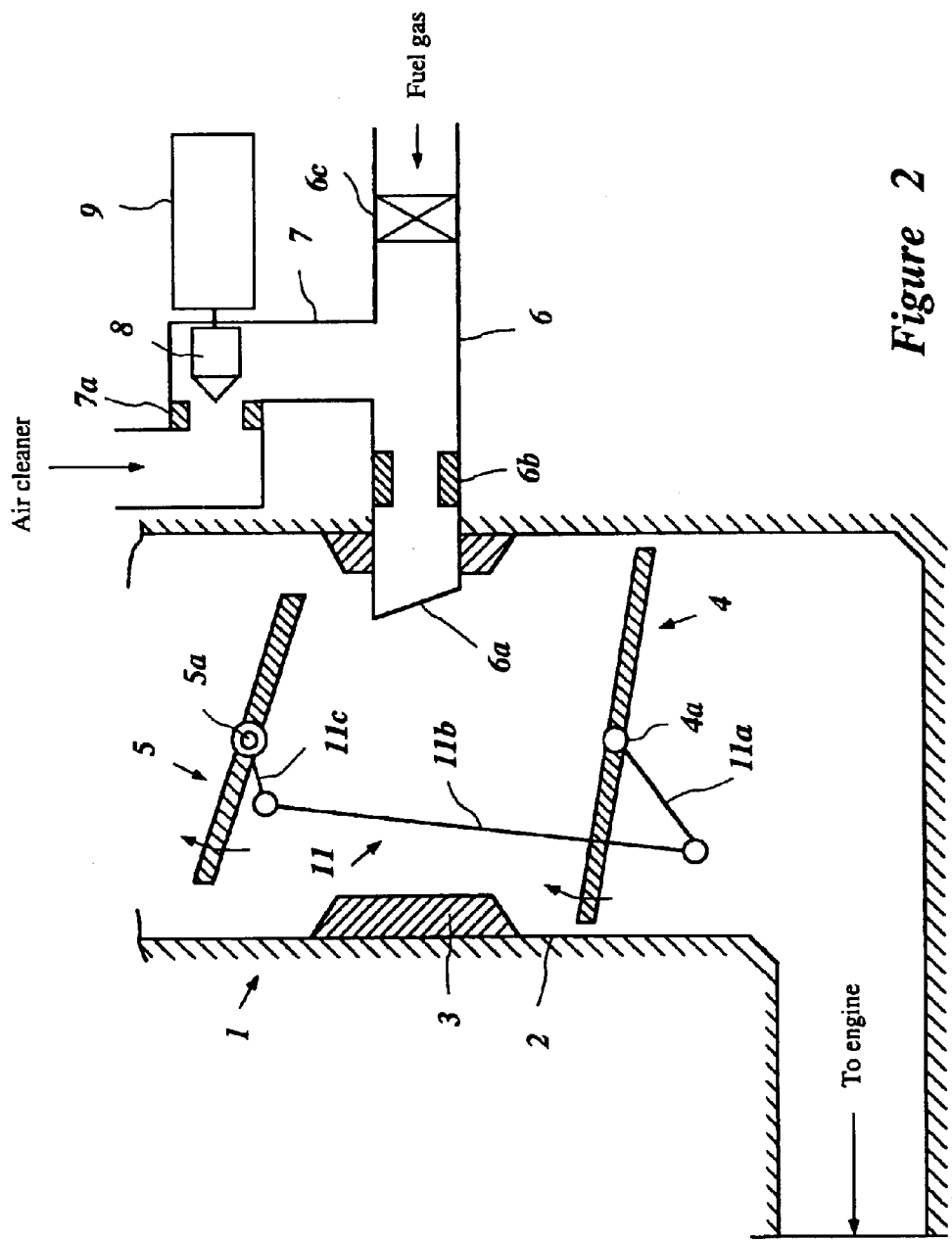
FIG. 2 is a schematic structural view of the mixer.
Figure 3:
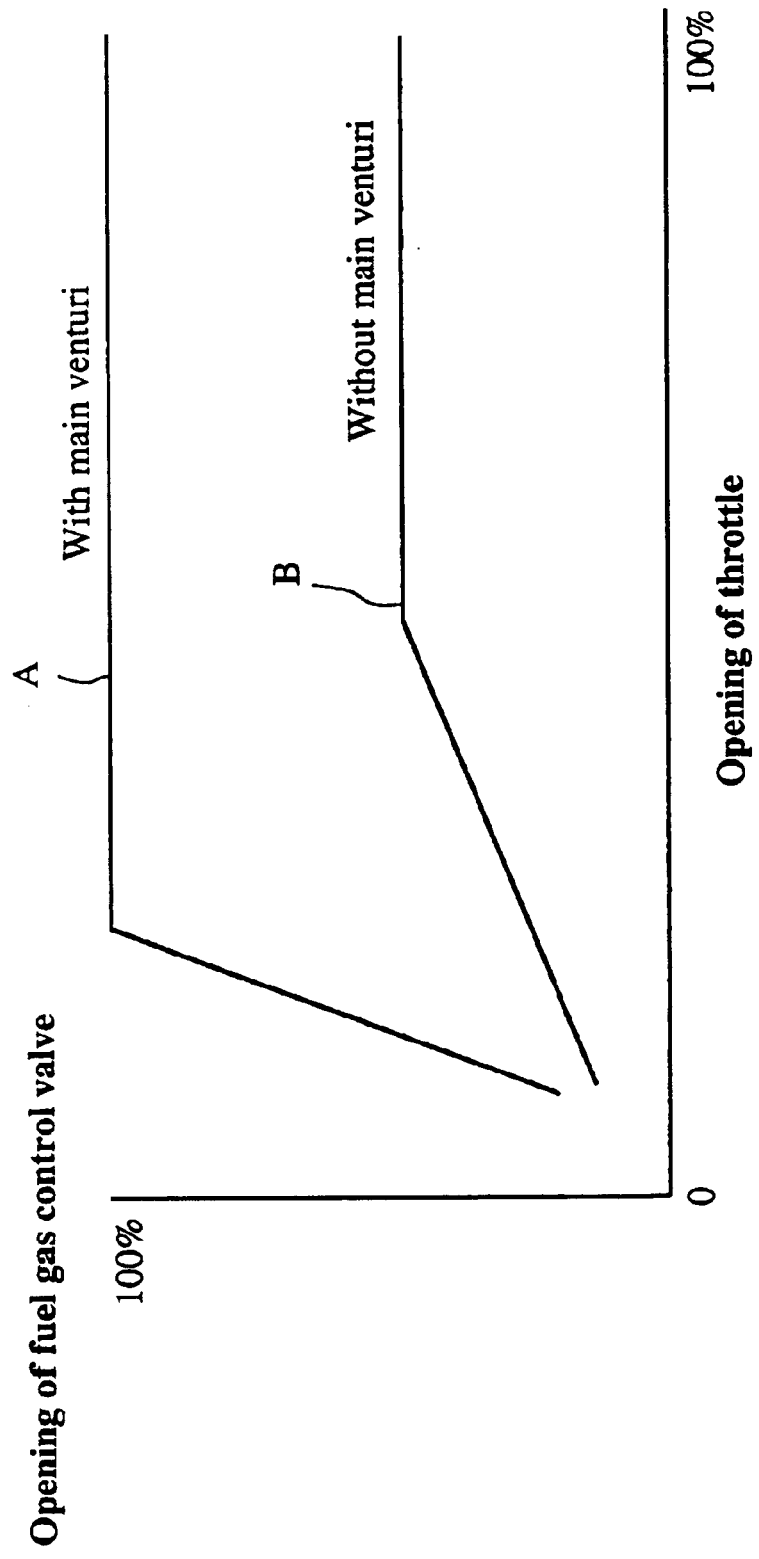
FIG. 3 is a graph showing opening characteristics of a fuel gas control valve of the mixer.
Figure 4:
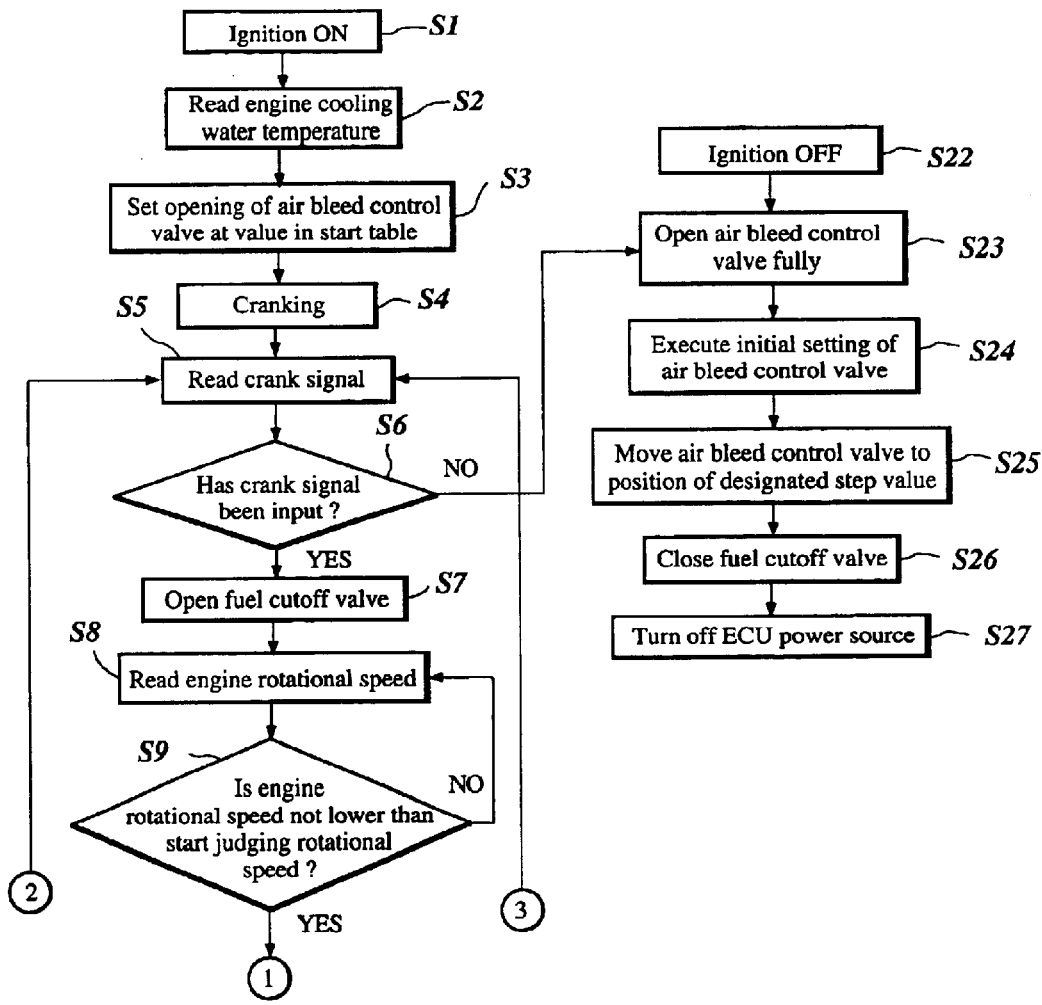
FIG. 4 is a flowchart for explaining an operation of the mixer.
Figure 4A:
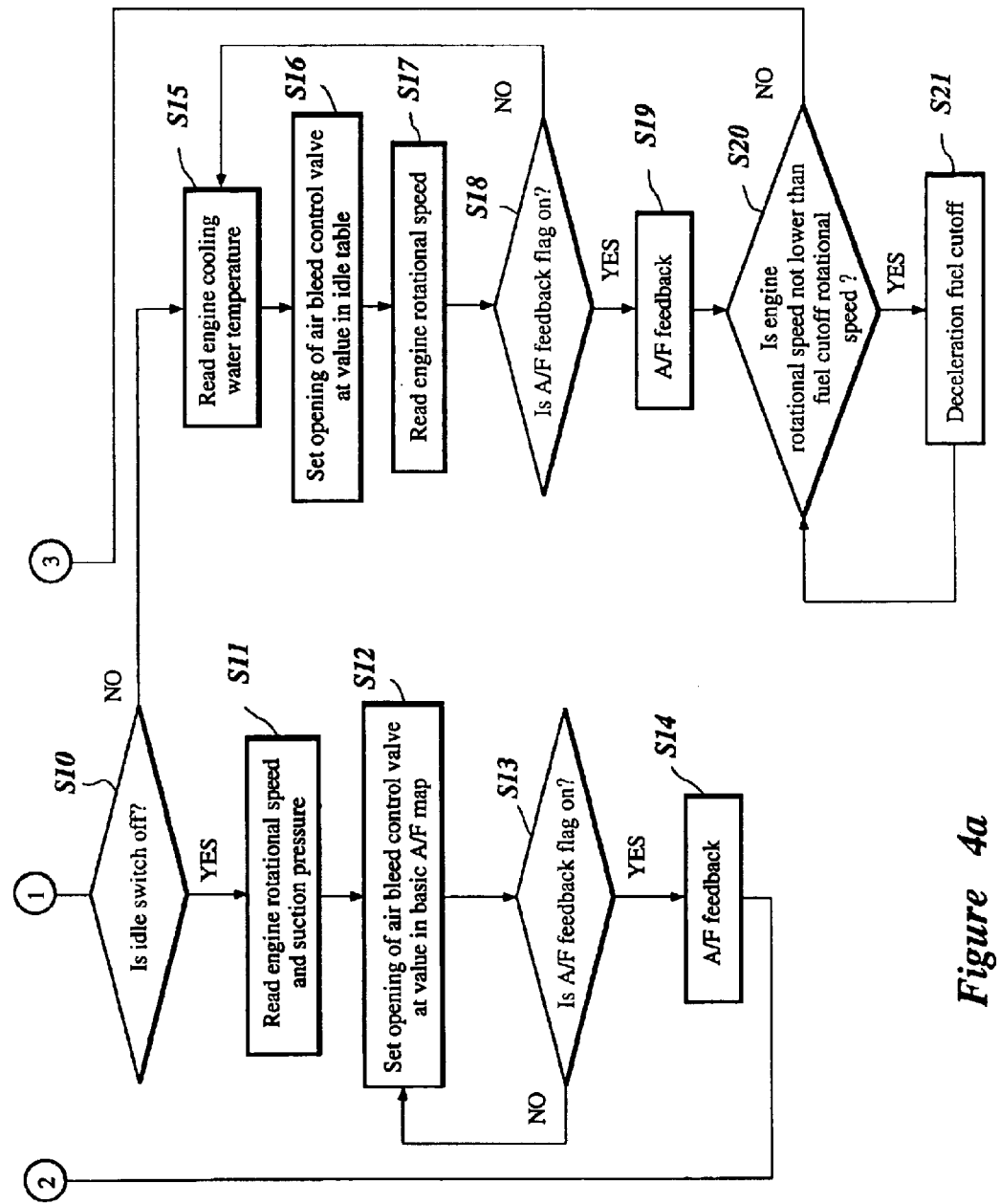
Figure 5:
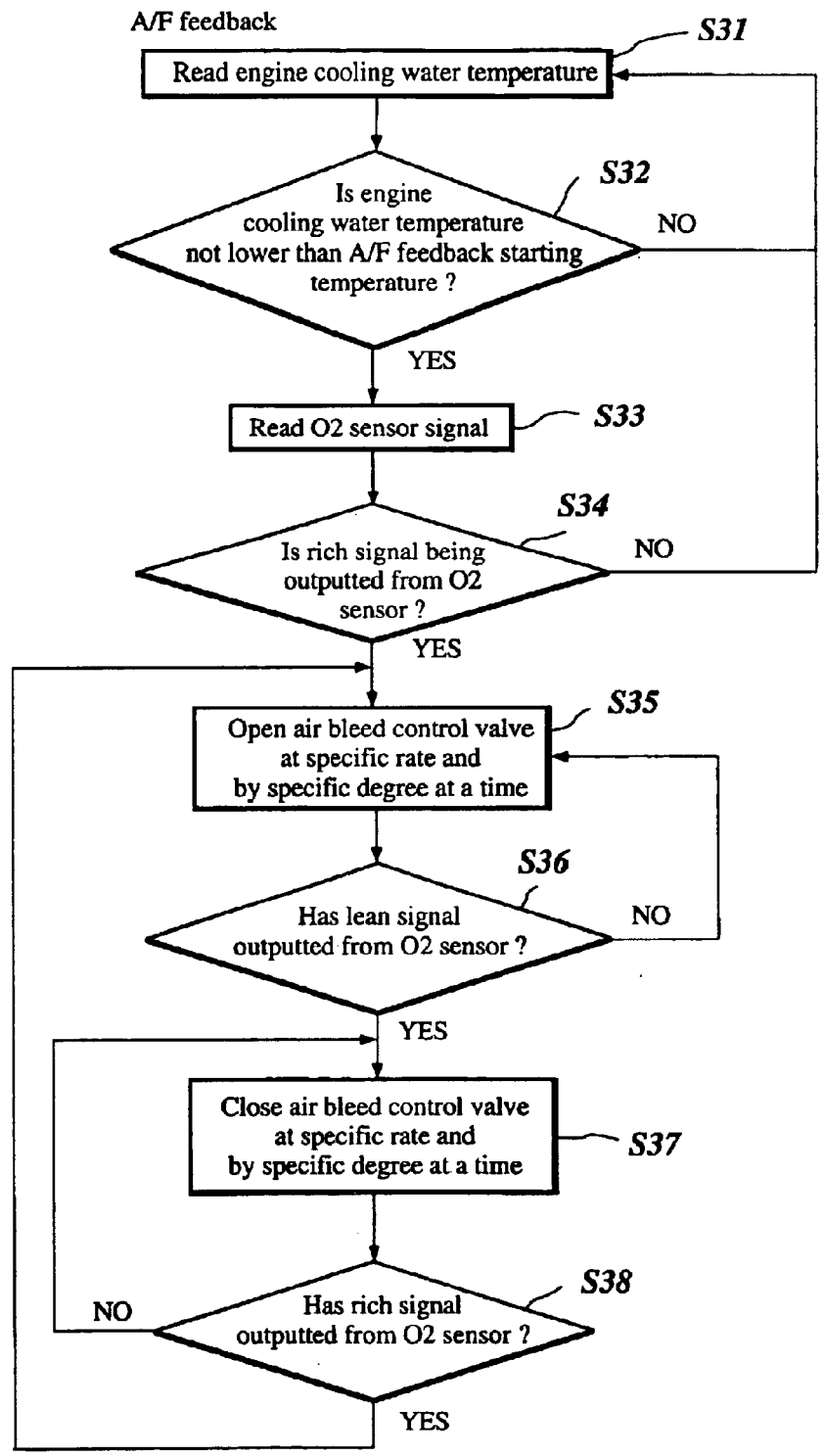
FIG. 5 is a flowchart for explaining an operation of the mixer.
Figure 6:
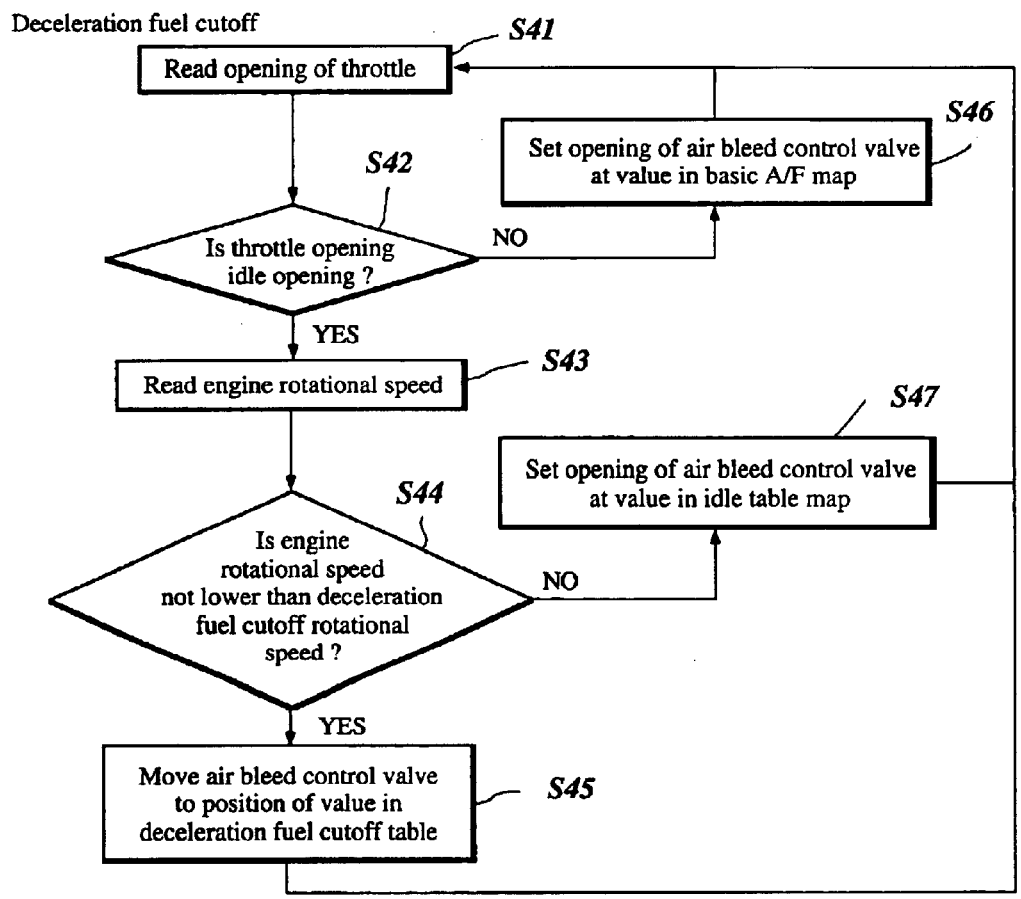
FIG. 6 is a flowchart for explaining an operation of the mixer.

FIG. 1 to FIG. 7 are views for explaining one embodiment of the present invention. FIG. 1 is a view illustrating a driving system of a fuel gas mixer of this embodiment, FIG. 2 is a schematic view of a link mechanism of the mixer, FIG. 3 is a view showing opening characteristics of a fuel gas control valve, FIG. 4 to FIG. 6 are flowcharts for explaining operations of the mixer, and FIG. 7 shows maps of various types.

In FIG. 1 and FIG. 2, designated as 1, is a fuel gas mixer connected to an engine. In an air intake passage 2 of the mixer 1, a butterfly type throttle valve 4 and a fuel gas control valve 5 for opening and closing the air intake passage 2 are provided downstream and upstream, respectively, of a main venturi part 3 that narrows the air intake passage 2. The air intake passage 2 has an upstream end to which an air cleaner is connected.

At the main venturi part 3, a discharge port 6a of a fuel gas passage 6 is opened. In fuel gas passage 6, an orifice 6b is formed in the vicinity of the discharge port 6a. The fuel gas passage 6 is connected to a fuel gas source via a fuel cutoff valve 6c.

An air passage 7 is connected to the fuel gas passage 6 upstream of the orifice 6b. The air passage 7 has an upstream end to which an air cleaner is connected. An orifice 7a is formed in the air passage 7 and there is provided an air bleed control valve 8 for varying the opening area of the orifice 7a. The air bleed control valve 8 is driven to move back and forth by a step motor 9 to control the flow rate of air passing therethrough.

The throttle valve 4 has a valve shaft 4a having an outer end to which a driving pulley 10 is secured. The driving pulley 10 is connected via a throttle cable to a throttle pedal in the driver's compartment, although not shown. The throttle valve 4 is rotated in accordance with the amount by which the driver depresses the pedal.

The fuel gas control valve 5 has a valve shaft 5a connected to the valve shaft 4a of the throttle valve 4 by a link mechanism 11. More specifically, the valve shaft 4a of the throttle valve 4 is connected to a throttle arm 11a such that they are incapable of rotating relative to each other, and the throttle arm 11a is in turn connected to a control arm 11c of the fuel gas control valve 5 by a connecting link 11b.

The fuel gas control valve 5 abuts on a stopper when fully opened. The control arm 11c is connected to the valve shaft 5a of the fuel gas control valve 5 such that they are rotatable relative to each other and rotationally urged to its minimum open position by an urging spring. Thereby, the control arm 11c can be rotated following the movement of the throttle valve 4 and the connecting link 11b connected thereto even after the fuel gas control valve 5 is fully opened.

When the throttle pedal is not stepped on, the throttle valve 4 and the fuel gas control valve 5 are maintained in their minimum open positions. The opening of the throttle valve 4 is increased in general proportion to the amount by which the throttle pedal is depressed. The fuel gas control valve 5 is fully opened when the opening of the throttle valve 4 becomes about 20–30% and is maintained in its full open position thereafter (see the characteristic curve A in FIG. 3).

It is possible to omit the main venturi 3 from the air intake passage 2. In this case, the fuel gas control valve 5 is adapted to open only up to 40–50% of the maximum as shown in the characteristic curve B in FIG. 3. Thereby, a suction negative pressure can be created at the connecting part of the fuel gas passage 6 without a main venturi.

The opening of the throttle valve 4 is detected and input into the ECU 13 by a throttle position sensor 12. Also input into the ECU 13 are various signals such as a signal representing an oxygen concentration in exhaust gas from an O2 sensor, a crank angle signal, a top signal representing the upper dead center, a suction pressure signal, a water temperature signal, and a catalyst temperature signal. From the ECU 13 are outputted various signals such as a driving signal to the step motor 9, an ignition timing signal, an OTP warning lamp signal for indicating that the catalyst is at an overheat temperature, and a radiator fan driving signal.

Description of the operations and effects of this embodiment will be made next.

A controlling operation by the ECU 13 is first described by a flowchart in FIG. 4. When the ignition key is turned on, the temperature of the engine cooling water is read and the opening of the air bleed control valve 8 is set to a value in a start table (see FIG. 7(b)) depending upon the engine cooling water temperature at the moment (Steps S1 to S3).

When cranking of the engine is started, a crank angle signal is read. When the crank angle signal is input, a fuel cutoff valve in a fuel gas supply system is opened and the rotational speed of the engine is read (Steps S4 to S8). When the sensed engine rotational speed is not lower than a "start judging" rotational speed and the idle switch is off, the engine rotational speed and the suction pressure are read. Then, based on the engine rotational speed and the suction pressure, the opening of the air bleed control valve 8 is set to a value in a basic air/fuel (A/F) map (see FIG. 7(a)) as a normal operation mode. Then, when an A/F feedback flag is on, an A/F feedback control is started (Steps S9 to S14).

If the idle switch is not off in Step S10, the engine cooling water temperature is read again. Then, the opening of the air bleed control valve 8 is set to a value in an idle table shown in FIG. 7(c) and the engine rotational speed is read (Steps S15 to S17). Then, when an A/F feedback flag is not on, the process goes back to Step S15. When an A/F feedback flag is on, an A/F feedback control is started (Steps S18 and S19). At a Step S20, when the engine rotational speed is lower than a fuel cutoff rotational speed, the process goes back to Step S5. When the engine rotational speed is not lower than the fuel cutoff rotational speed (such as when the engine brake is in operation), a deceleration fuel cutoff is performed until the engine rotational speed becomes lower than the fuel cutoff rotational speed (Steps S20 and S21).

When the ignition key is turned off (Step S22) or when a crank angle signal is not input in Step S6, the air bleed control valve 8 is fully opened and an initial setting of the air bleed control valve 8 (correction of the initial value) is executed, whereby the air bleed control valve 8 is moved to a position of the designated step value (Steps S23 to S25). Hereupon, the fuel cutoff valve is closed and the power source of the ECU is turned off (Steps S26 and S27).

Specifically, the A/F feedback control is performed as shown in FIG. 5. When the engine cooling water temperature is read and it is not lower than a temperature for starting an A/F feedback control, an O2 sensor signal is read (Steps S31 to S33). When the O2 sensor signal is a rich signal, the air bleed control valve 8 is opened at a specific rate selected from a map shown in FIG. 7(e) based on the suction pressure and the engine rotational speed and by a specific degree or amount selected in the same manner from a map shown in FIG. 7(f) at a time until the rich signal is changed to a lean signal. Hereupon, the air bleed control valve 8 is closed at a specific rate selected in the same manner as above from a map shown in FIG. 7(g) and by a specific degree or amount selected in the same manner from a map shown in FIG. 7(h) at a time until the O2 sensor signal is changed to a rich signal (Steps S36 to S37). Then, when a rich signal is outputted from the O2 sensor, the process goes to Step S35. When a rich signal is not outputted from the O2 sensor, the process goes to Step S37 (Step S38).

Specifically, the deceleration fuel cutoff control is performed as shown in FIG. 6. When the opening of the throttle is an idle opening, the engine rotational speed is read. When the engine rotational speed is not lower than the deceleration fuel cutoff rotational speed (such as when the engine brake is in operation), the air bleed control valve 8 is opened to a value in a deceleration fuel cutoff table shown in FIG. 7(d) (Steps S41 to S45). The amount of bleed air introduced is thereby increased and the amount of fuel gas is decreased. Then, the process goes back to Step S41. The supply of the fuel gas may be cut off by closing the fuel cutoff valve 6c instead of opening the air bleed control valve 8.

When the opening of the throttle is not the idle opening in Step S42, the opening of the air bleed control valve 8 is set to a value in a basic A/F map as a normal operation mode in Step S46. Then, the process goes back to Step S41. When the engine rotational speed is lower than the deceleration fuel cutoff rotational speed in Step S44, the opening of the air bleed control valve 8 is set to a value in the idle table map shown in FIG. 7(c) (Step S47).

As described above, in the fuel gas mixer of this embodiment, the opening of the fuel gas control valve 5 is adapted to vary depending upon the opening of the throttle valve 4 so that, in an operation range in which the opening of the throttle valve 4 is small, the opening of the fuel gas control valve 5 may be also small. The fuel gas control valve 5 is provided in the air intake passage 2 upstream of the connecting part of the fuel gas supply passage 6, and it is possible to create a suction negative pressure by which the flow rate of the fuel can be arbitrarily controlled at the opening 6a of the fuel gas passage 6.

The fuel gas mixer does not need a high-pressure gas injector as in a conventional device and thus receives no limitation caused by the characteristics of the injector. It is thus unnecessary to provide more than one mixer even in an engine with a large capacity per cylinder, so that an A/F feedback control can be performed with a simple control.

Also, since a slow fuel system is unnecessary, it is only necessary to provide a main fuel system (the fuel gas passage 6). Thus, an A/F feedback control can be achieved over the entire operation range by controlling only the main fuel system.

Additionally, in this embodiment, the fuel gas control valve 5 is connected to the throttle valve 4 by the link mechanism 11, thereby constituting the means for controlling the opening of the fuel gas control valve 5. Thus, it is possible to create, with a simple structure, a suction negative pressure by which the fuel flow rate can be controlled at the opening 6a of the fuel gas passage 6 by reducing the opening of the fuel gas control valve 5 when the opening of the throttle valve 4 is small.

Moreover, since the link mechanism 11 is configured such that the fuel gas control valve 5 is fully opened prior to the throttle valve 4 being fully opened, it is possible to prevent the fuel gas control valve 5 from being a resistance to the intake air flow. This is prevented because the fuel gas control valve 5 has been fully opened when the engine enters an intermediate- or high-load operation range in which the opening of the throttle valve 4 is large.

Furthermore, since the air passage 7 is connected partway along the fuel gas supply passage 6 and the cross-sectional area of the air passage 7 is adapted to be controlled, the amount of the fuel gas to be supplied can be controlled more accurately and easily as compared with the case where the supply is controlled only by the fuel gas control valve 5.

The main venturi 3 can be omitted when the opening characteristic of the fuel gas control valve 5 is controlled to draw a characteristic curve like the curve B shown in FIG. 3. In this case, since a throttling loss of intake air caused by the main venturi 3 is not created, the amount of intake air at the time when the throttle valve 4 is fully opened can be increased, making it possible to obtain a high power.

FIG. 8 to FIG. 12 are views for explaining a second embodiment of the present invention in which similar parts are designated by the same numerals as in FIG. 1 to FIG. 7.

In the second embodiment, the fuel gas control valve 5 is rotatably driven directly by a step motor 14. The opening of the fuel gas control valve 5 is detected by an opening sensor 15 and a signal representing the opening of the fuel gas control valve 5 from the opening sensor 15 is input into the ECU 13.

The operations of the second embodiment will be described by flowcharts shown in FIG. 10 and FIG. 11. The basic operations are the same as those of the first embodiment. In the first embodiment, the opening of the air bleed control valve 8 is controlled, whereas the opening of the fuel gas control valve 5 is controlled in the second embodiment.

When an ignition key is turned on and the temperature of the engine cooling water is read (Steps S1 and S2), the opening of the fuel gas control valve 5 is set to a value in a start table (the table shown in FIG. 7(b) is utilized), in which the lower the temperature of the engine cooling water is, the smaller the opening of the fuel gas control valve 5 is, depending upon the engine cooling water temperature at the moment (Step S3').

When the engine is cranked and a crank angle signal is input, the fuel cutoff valve 6c is opened and the engine rotational speed is read. When the engine rotational speed is not lower than a "start judging" rotational speed and an idle switch is off (Steps S4 to S10), the engine rotational speed and the suction pressure are read. Then, based on the engine rotational speed and the suction pressure, the opening of the fuel gas control valve 5 is set to a value in a basic A/F map as a normal operation mode (the map shown in FIG. 7(a) is utilized) (Steps S11 and S12'). Then, when an A/F feedback flag is on, an A/F feedback control is started (Steps S13 and S14).

When the idle switch is not off in Step S10, the engine cooling water temperature is read again (Step S15) and the opening of the fuel gas control valve 5 is set to a value in an idle table (the map shown in FIG. 7(c) is utilized) (Step S16'). Then, the engine rotational speed is read. When an A/F feedback flag is not on, the process returns to Step S15. When an A/F feedback flag is on, an A/F feedback control is started (Steps S17 to S19). At a Step S20, when the engine rotational speed is lower than the fuel cutoff rotational speed, the process returns to Step S5. When the engine rotational speed is not lower than the fuel cutoff rotational speed (such as when the engine brake is in operation), a deceleration fuel cutoff is performed until the engine rotational speed becomes lower than the fuel cutoff rotational speed (Steps S20 and S21).

When the ignition key is turned off (Step S22) or when a crank angle signal is not input in Step S6, the fuel gas control valve 5 is fully opened (Step S23'). Then, the opening of the fuel gas control valve 5 detected by the opening sensor 15 is read (Step S24'), and the initial value of the opening sensor is corrected (Step S25'). Hereupon, the fuel cutoff valve is closed, and an ECU power source is turned off (Steps S26 and S27).

Figure 11:
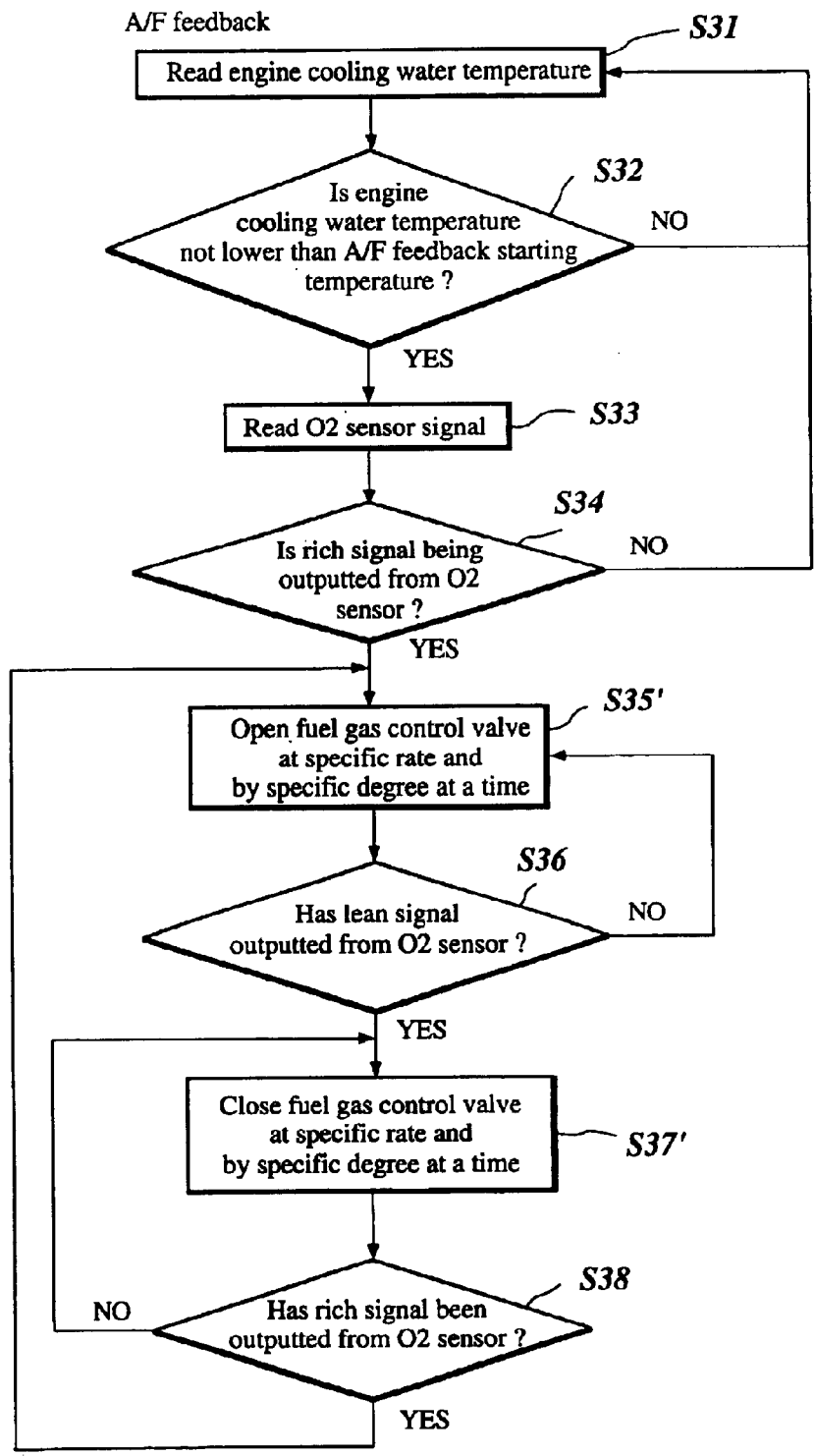
FIG. 11 is a flowchart for explaining an operation of the mixer of FIG. 8.

Specifically, the A/F feedback control is performed as shown in FIG. 11. When the engine cooling water temperature is not lower than the A/F feedback control starting temperature and the $O_2$ sensor signal is a rich signal (Steps S31 to S34), the fuel gas control valve 5 is opened at a specific rate selected from a map obtained utilizing the map shown in FIG. 7(e) based on the suction pressure and the engine rotational speed and by a specific degree or amount selected in the same manner from a map obtained utilizing the map shown in FIG. 7(f) at a time until the rich signal is changed to a lean signal (Step S35'). Then the fuel gas control valve 5 is closed at a specific rate selected in the same manner as above utilizing the map shown in FIG. 7(g) and by a specific degree or amount selected in the same manner utilizing the map shown in FIG. 7(h) at a time until the $O_2$ sensor signal is changed to a lean signal (Steps S36 and S37'). Then, when a rich signal is outputted from the $O_2$ sensor, the process goes to Step S35'. When a rich signal is not outputted from the $O_2$ sensor, the process goes to Step S37' (Step S38).

Figure 12:
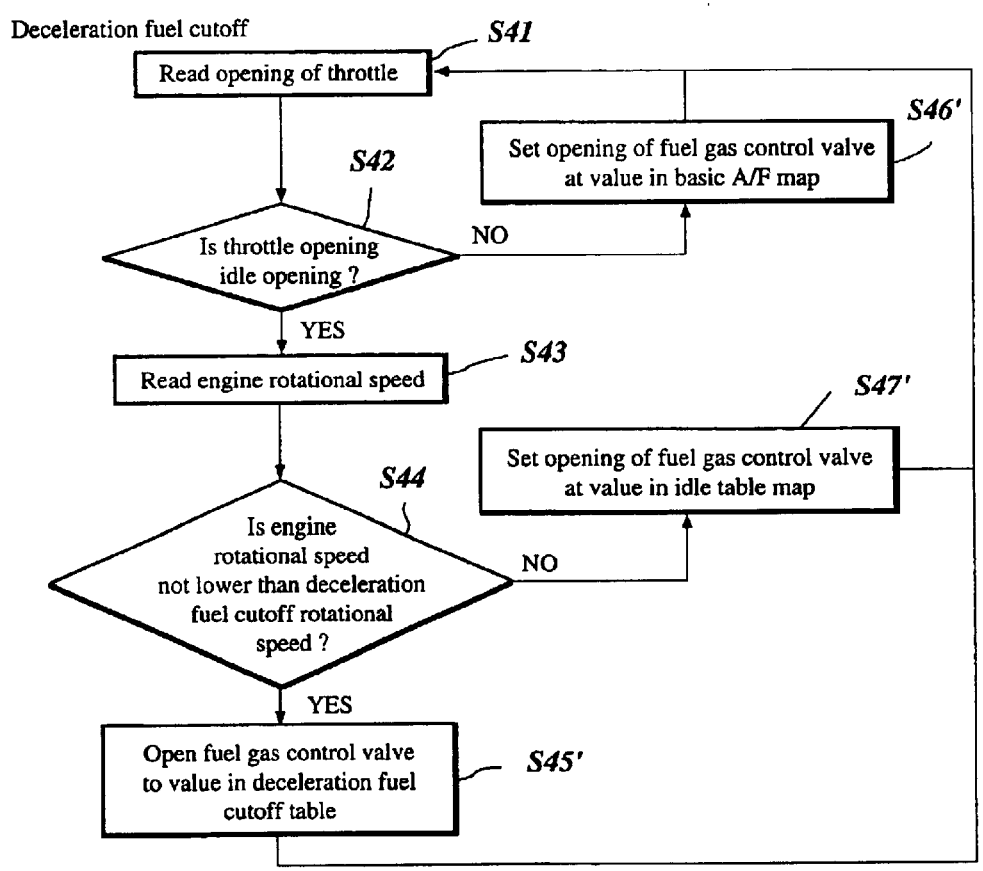
FIG. 12 is a flowchart for explaining an operation of the mixer of FIG. 8.
Figure 13:
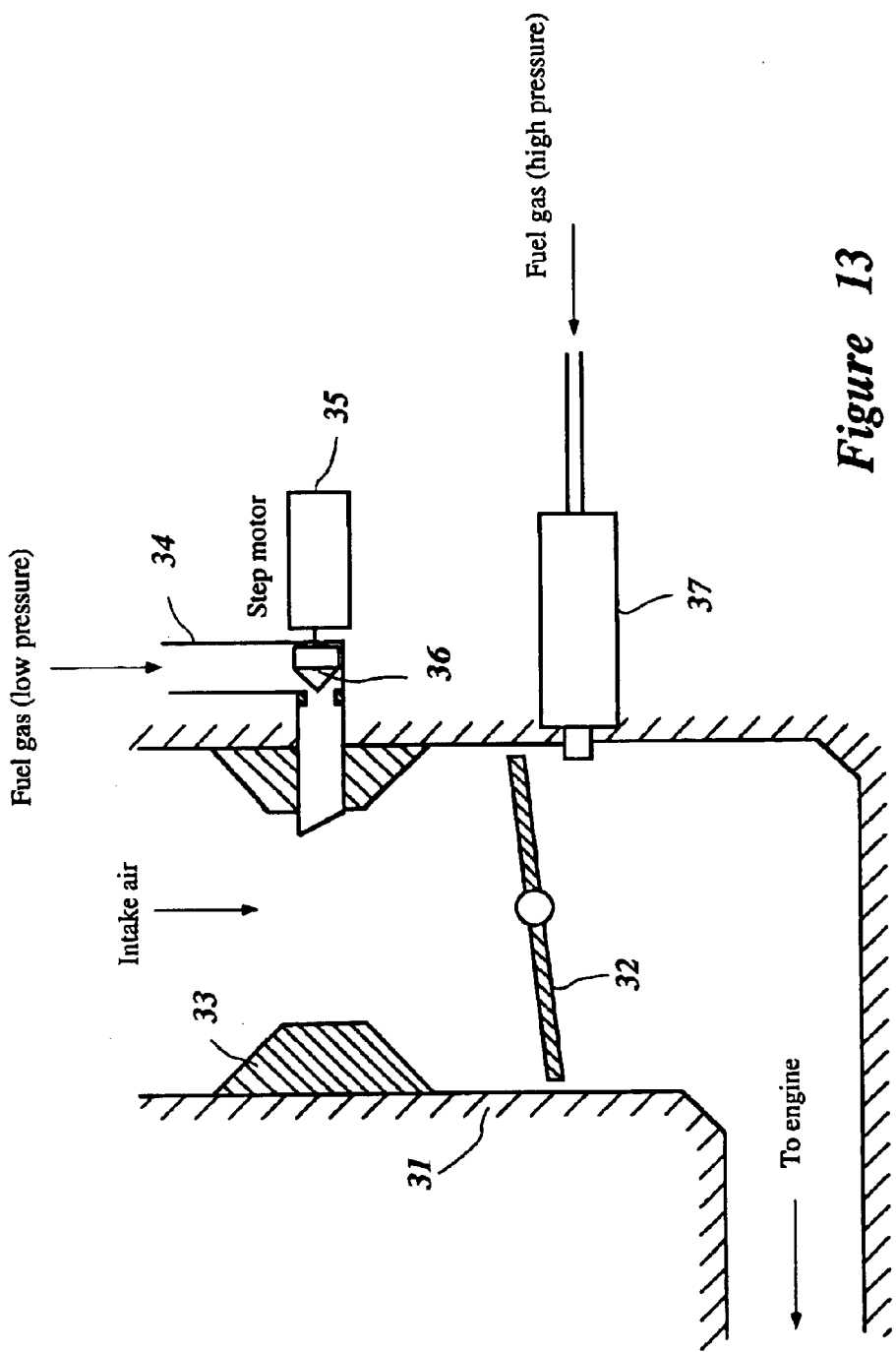
FIG. 13 is a schematic structural view of a conventional fuel gas mixer.

Specifically, the deceleration fuel cutoff control is performed as shown in FIG. 12. When the opening of the throttle is an idle opening, the engine rotational speed is read (Steps S41 to S43). When the engine rotational speed is not lower than the deceleration fuel cutoff rotational speed (such as when the engine brake is in operation) (Step S44), the fuel gas control valve 5 is opened to a value in a deceleration fuel cutoff table (the table shown in FIG. 7(d) is utilized) (Step S45'). Thereby, the negative pressure exerted at the opening 6a is decreased and the amount of fuel gas sucked out therefrom is decreased. Then, the process goes back to Step S41. At this time, the supply of the fuel gas may be cut off by closing the fuel cutoff valve 6c instead of opening the fuel gas control valve 5.

When the opening of the throttle is not the idle opening in Step S42, the opening of the fuel gas control valve 5 is set to a value in a basic A/F map (the map shown in FIG. 7(a) is utilized) as a normal operation mode (Step S46'). Then, the process goes back to Step S41. When the engine rotational speed is lower than the deceleration fuel cutoff rotational speed in Step S44, the opening of the fuel gas control valve 5 is set to a value in an idle table map obtained utilizing the map shown in FIG. 7(c) (Step S47').

Since the values indicated in the maps shown in FIG. 7(a) to FIG. 7(h) are for setting the opening and such of the air bleed control valve 8, the values must be changed to values for the openings and such of the fuel gas control valve 5 when the maps are applied to the fuel gas control valve 5.

According to the second embodiment, since the fuel gas control valve is opened and closed by the step motor 15, the opening of the fuel gas control valve 5 can arbitrarily be controlled to a desired degree with accuracy. Especially in an operation range in which the opening of the throttle valve is small (a low-load operation range), a negative suction pressure can arbitrarily be created by controlling the opening of the fuel gas control valve 5 and the amount of fuel to be supplied can be controlled with accuracy by the thus created negative suction pressure.

As above, since the amount of fuel to be supplied can be controlled by only controlling the opening of the fuel gas control valve 5, the fuel supply system can be simplified in structure.

Industrial Applicability

According to the invention of Claim 1, since a fuel gas control valve, whose opening is adapted to vary depending upon the operating state of the engine, is provided in an air intake passage upstream of the connecting part of a fuel gas supply passage, a negative suction pressure, by which the flow rate of the fuel can arbitrarily be controlled, can be created at the connecting part of the fuel gas supply passage by reducing the opening of the fuel gas control valve in an operation range in which the opening of the throttle valve is small.

This makes a main venturi unnecessary and thus can eliminate a throttling loss of intake air caused by the main venturi, making it possible to obtain a high power.

Also, since there is no need to provide more than one mixer even in an engine having a large capacity per cylinder, an A/F feedback operation can be performed with a simple control.

Additionally, since a slow fuel system is unnecessary, it is only necessary to provide a main fuel system. Thus, an A/F feedback control can be achieved over the entire operation range by controlling only the main fuel system.

Moreover, since a high pressure gas injector is also unnecessary, a high pressure gas system including a regulator can be omitted, resulting in simplification of the structure and decrease in costs.

According to the invention of Claim 2, since the fuel gas control valve is connected to the throttle valve by a link mechanism, it is possible to create a negative suction pressure by which the fuel flow rate can be controlled at the connecting part of the fuel gas passage by reducing the opening of the fuel gas control valve when the opening of the throttle valve is small with a simple structure.

Also, since the link mechanism is so constituted that the fuel gas control valve is fully opened prior to the throttle valve being fully opened, it is possible to prevent the fuel gas control valve from being a resistance to intake air flow in an intermediate- or high-load operation range in which the opening of the throttle valve is large.

According to the invention of claim 3, since the air passage is connected partway along the fuel gas supply passage and the cross-sectional area of the air passage is adapted to be controlled, the amount of fuel gas to be supplied can be controlled with accuracy and ease.

According to the invention of Claim 4, since the fuel gas control valve is opened and closed by a step motor, the opening of the gas control valve can be controlled to any degree with accuracy. Especially, as in the invention of Claim 5, the amount of fuel to be supplied can be controlled with accuracy by a suction negative pressure created depending upon the opening of the fuel gas control valve in at least a low-load operation range.

Of course, the foregoing description is that of preferred embodiments having certain features, aspects and advantages in accordance with the present invention.

What is claimed is:

1. A fuel gas mixer comprising an air intake passage connected to an engine, a throttle valve provided in said air intake passage for opening and closing said air intake passage, and a fuel gas supply passage connected to said air intake passage at a position upstream of said throttle valve, characterized in that a fuel gas control valve for opening and closing said air intake passage is provided in said air intake passage at a position upstream of the position at which said fuel gas supply passage is connected to said air intake passage and in that fuel gas control valve controlling means is provided for varying the degree of opening of said fuel gas control valve according to the operating state of said engine, the fuel gas mixer characterized in that said fuel gas control valve controlling means comprises a link mechanism connecting said fuel gas control valve to said throttle valve, and said link mechanism is adapted to fully open said fuel gas control valve before said throttle valve is fully opened.

2. A fuel gas mixer according to claim 1, characterized in that an air passage is connected partway along said fuel gas supply passage, wherein the amount of fuel gas to be supplied is controlled by controlling the cross-sectional area of said air passage.

3. An air/fuel charge forming device for an engine comprising an engine body defining at least one combustion chamber therein, the air/fuel charge forming device comprising an air induction passage configured to guide air to the engine body, a first valve disposed in the induction passage and configured to affect a flow of air through the induction passage, an engine load input control device connected to the first valve, so as to move the first valve in accordance with an engine load request, a fuel delivery port disposed in the induction passage upstream from the first valve, a second valve disposed in the induction passage upstream of the fuel delivery port and configured to affect a flow of air through the induction passage, the second valve being configured to affect a velocity of the airflow past the fuel delivery port, wherein the first valve is configured to move between maximum and minimum opening positions, the second valve being configured to move between maximum and minimum opening positions, the charge forming device further comprising a control mechanism configured to move the second valve to its maximum opening position before the first valve reaches its maximum open position, wherein the control mechanism comprises a plurality of linking arms.

4. An air/fuel charge forming device for an engine comprising an engine body defining at least one combustion chamber therein, the air/fuel charge forming device comprising an air induction passage configured to guide air to the engine body, a first valve disposed in the induction passage and configured to affect a flow of air through the induction passage, an engine load input control device connected to the first valve, so as to move the first valve in accordance with an engine load request, a fuel delivery port disposed in the induction passage upstream from the first valve, a second valve disposed in the induction passage upstream of the fuel delivery port and configured to affect a flow of air through the induction passage, the second valve being configured to affect a velocity of the airflow past the fuel delivery port, wherein the first valve is configured to move between maximum and minimum opening positions, the second valve being configured to move between maximum and minimum opening positions, the charge forming device further comprising a control mechanism configured to move the second valve to its maximum opening position before the first valve reaches its maximum open position, wherein the control mechanism comprises a stepper motor driving the second valve.

5. An air/fuel charge forming device for an engine comprising an engine body defining at least one combustion chamber therein, the air/fuel charge forming device comprising an air induction passage configured to guide air to the engine body, a first valve disposed in the induction passage and configured to affect a flow of air through the induction passage, an engine load input control device connected to the first valve, so as to move the first valve in accordance with an engine load request, a fuel delivery port disposed in the induction passage upstream from the first valve, a second valve disposed in the induction passage upstream of the fuel delivery port and configured to affect a flow of air through the induction passage, the second valve being configured to affect a velocity of the airflow past the fuel delivery port, wherein the first valve is configured to move between maximum and minimum opening positions, the second valve being configured to move between maximum and minimum opening positions, the charge forming device further comprising a control mechanism configured to move the second valve to its maximum opening position before the first valve reacheses its maximum open position, when the control mechanism is configured to move the second valve to its maximum opening position when the first valve is in a first load position in corresponding to 20–30 percent of its maximum opening position.

6. The charge forming device according to claim 5, wherein the control mechanism is configured to maintain the second valve at its maximum opening position as the first valve moves between the first load position and its maximum opening position.

* * * * *

UNITED STATES PATENT AND TRADEMARK OFFICE
CERTIFICATE OF CORRECTION

PATENT NO.         : 6,945,231 B2
APPLICATION NO. : 10/149895
DATED                  : September 20, 2005
INVENTOR(S)       : Yoshikatsu Iida It is certified that error appears in the above-identified patent and that said Letters Patent is hereby corrected as shown below:

At column 2, line 8, before "controlling" please delete "value" and insert -- valve --, therefor.

At column 2, line 10, after "control" please delete "value" and insert -- valve --, therefor.

At column 1, line 40, after "ratio is" please delete "low" and insert -- lean --, therefor.

At column 1, line 66, please delete "Claim 1 recites" and insert -- In accordance with one aspect of the present invention, --, therefor.

At column 1, line 66, please delete "compromising" and insert -- comprises --, therefor.

At column 2, lines 3-4, after "valve" please delete ", characterized in that a" and insert -- . A --, therefor.

At column 2, lines 7-8, after "passage" please delete "and in the" and insert -- . Additionally, --, therefor.

At column 2, lines 11-12, before "control valve" please delete "Claim 2 recites a fuel gas mixer according to Claim 1, characterized in that the gas" and insert -- A further advantage is provided where the fuel gas --, therefor.

At column 2, lines 17-18, please delete "Claim 3 recites a fuel gas mixer according to Claim 2, characterized in that" and insert -- Another further advantage is provided where --, therefor.

UNITED STATES PATENT AND TRADEMARK OFFICE
CERTIFICATE OF CORRECTION

| | |
|---|---|
| PATENT NO. | : 6,945,231 B2 |
| APPLICATION NO. | : 10/149895 |
| DATED | : September 20, 2005 |
| INVENTOR(S) | : Yoshikatsu Iida |

It is certified that error appears in the above-identified patent and that said Letters Patent is hereby corrected as shown below:

At column 2, lines 23-24, please delete "Claim 4 recites a fuel gas mixer according to Claim 1, characterized in that" and insert -- Yet another advantage is achieved where --, therefor.

At column 2, line 25, please delete "mean" and insert -- means --, therefor.

At column 2, lines 27-28, please delete "Claim 5 recites a fuel gas mixer according to Claim 4, characterized in that" and insert -- Another advantage is provided where --, therefor.

At column 2, line 37, please delete "a" and insert -- an enlarged --, therefor.

At column 2, line 40, please delete "for explaining" and insert -- illustrating --, therefor.

At column 2, line 42, please delete "for explaining" and insert -- illustrating --, therefor.

At column 2, line 44, please delete "for explaining" and insert -- illustrating --, therefor.

At column 2, line 46, please delete "for explaining" and insert -- illustrating --, therefor.

Figure 8:
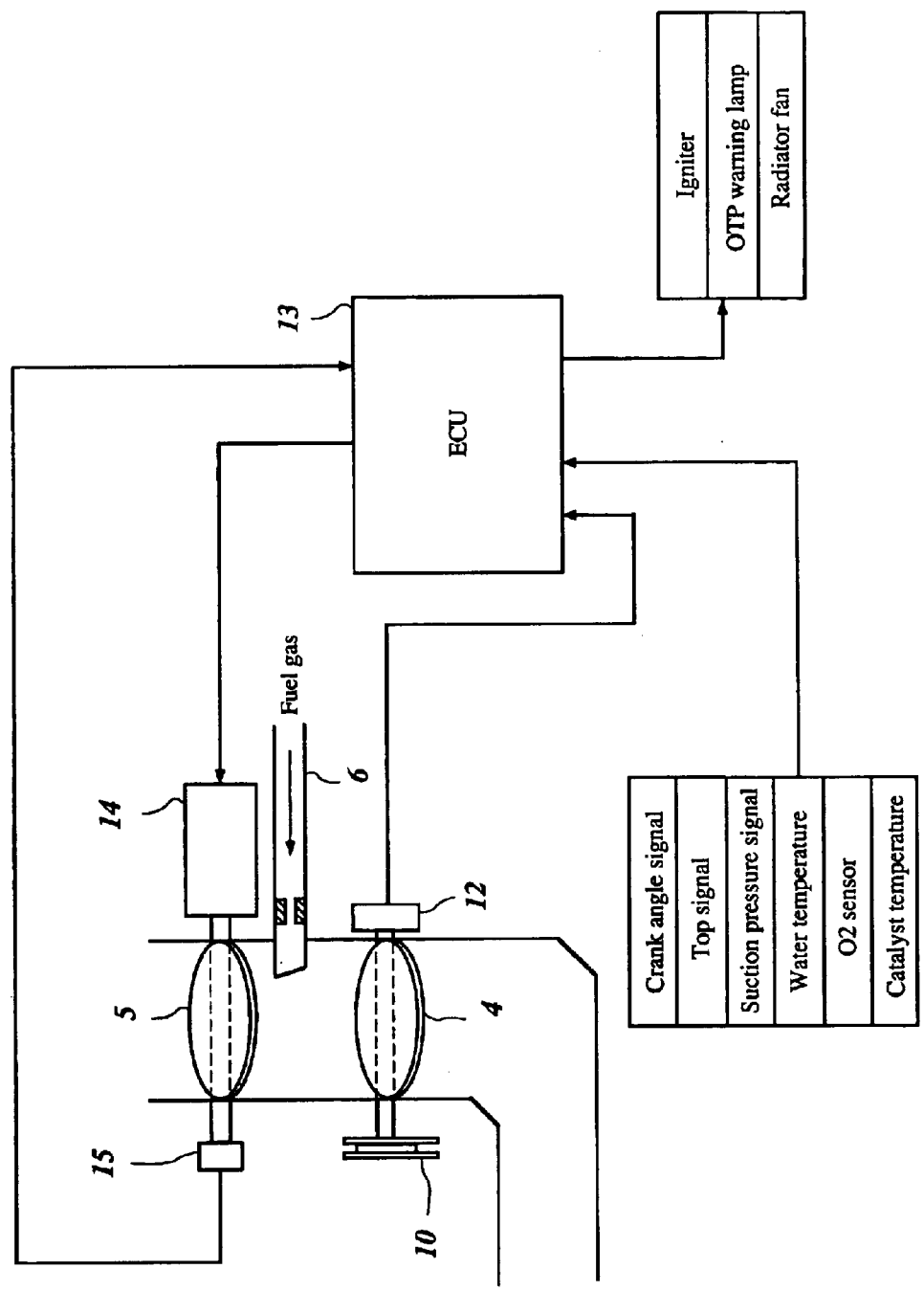
FIG. 8 is a schematic structural view of a system of a fuel gas mixer according to another embodiment of the present invention.
Figure 9:
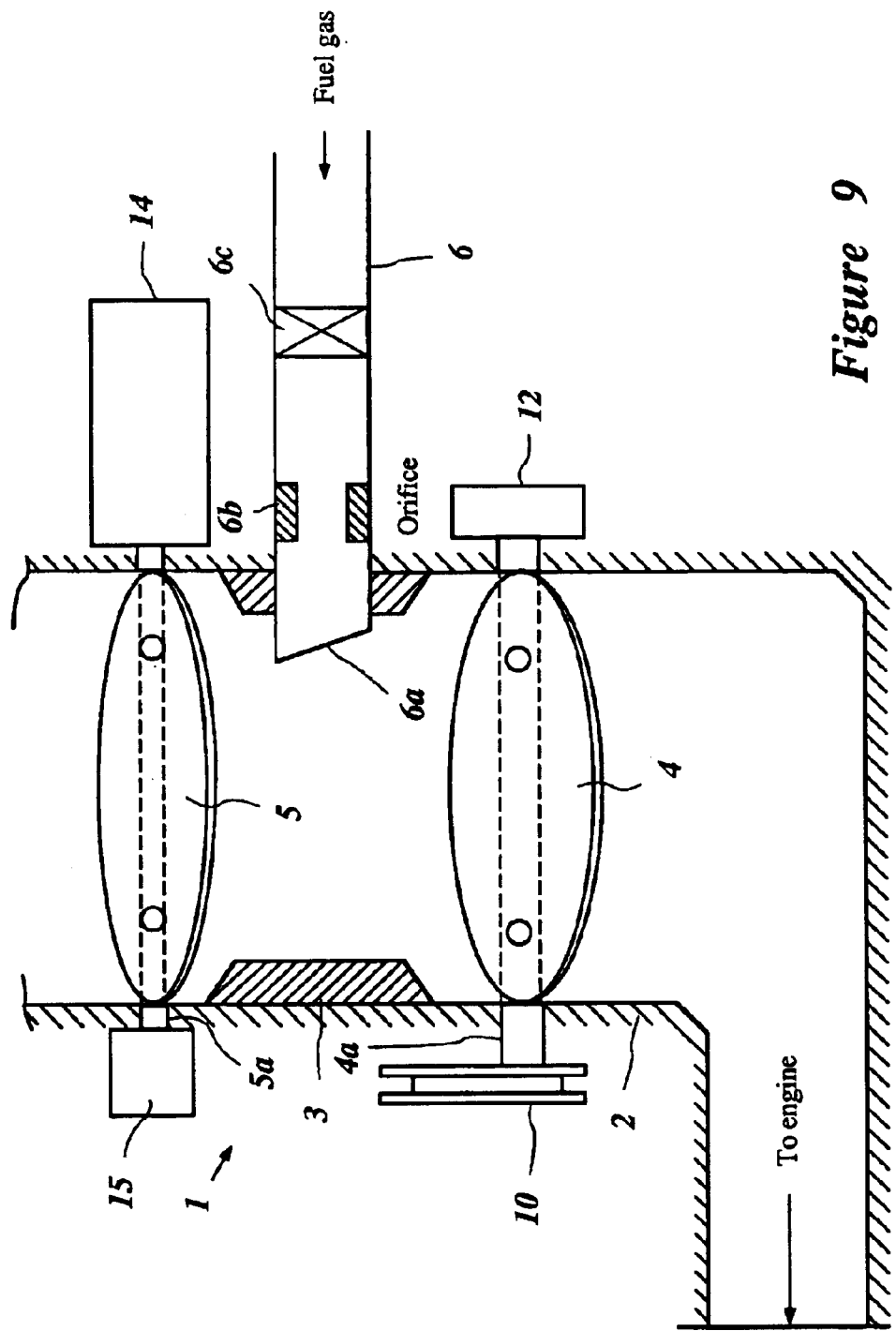
FIG. 9 is an enlarged schematic structural view of the mixer of FIG. 8.
Figure 10:
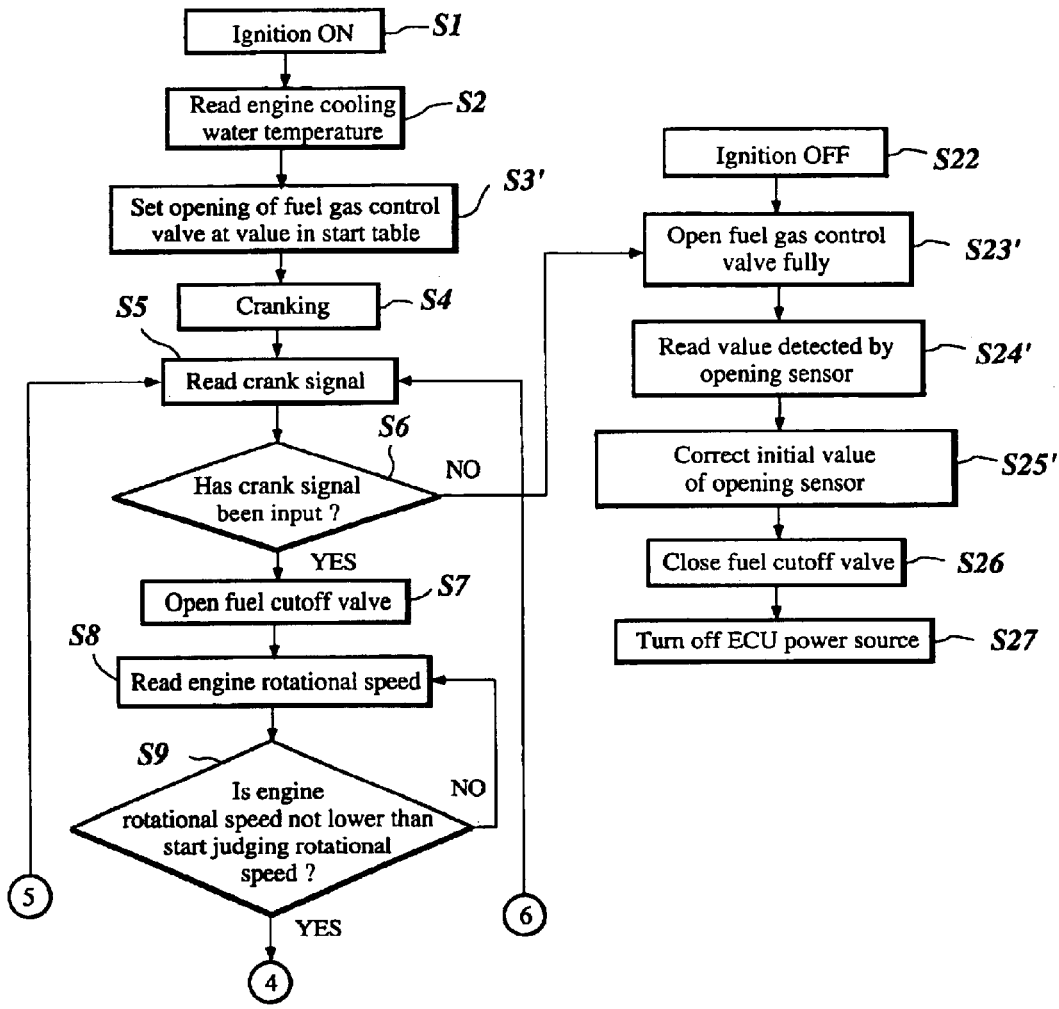
FIG. 10 is a flowcharts for explaining an operation of the mixer of FIG. 8.
Figure 10A:
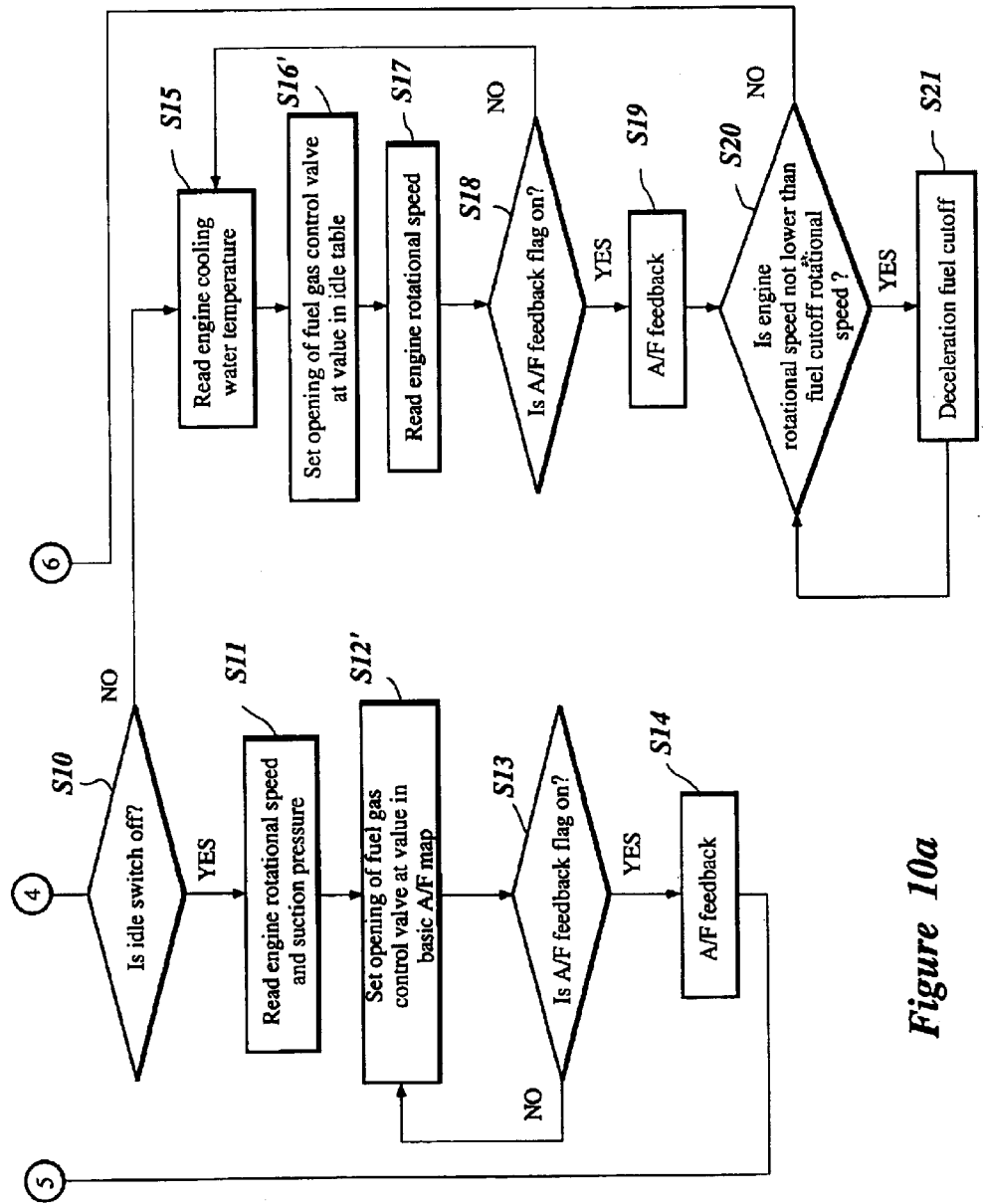

At column 2, lines 54-55, please delete "FIG. 10 is a flowcharts for explaining an operation of the mixer of FIG. 8;" and insert -- FIGS. 10A and 10B are flowcharts illustrating an operation of the mixer of FIG. 8, FIG. 10A including identifiers 4, 5, and 6 showing a connection between the flowchart in FIG. 10A with the flowchart of FIG. 10B; --, therefor.

UNITED STATES PATENT AND TRADEMARK OFFICE
CERTIFICATE OF CORRECTION

| | |
|---|---|
| PATENT NO. | : 6,945,231 B2 |
| APPLICATION NO. | : 10/149895 |
| DATED | : September 20, 2005 |
| INVENTOR(S) | : Yoshikatsu Iida |

It is certified that error appears in the above-identified patent and that said Letters Patent is hereby corrected as shown below:

At column 2, line 56, please delete "for explaining" and insert -- illustrating --, therefor.

At column 2, line 58, please delete "for explaining" and insert -- illustrating --, therefor.

At column 3, line 1, please delete "are views for explaining" and insert -- illustrate --, therefor.

At column 3, line 17, please delete "is opened." and insert -- opens. --, therefor.

At column 3, line 17, after "6b" please insert -- (Figure 2) --.

At column 3, line 30, before "is secured." please insert -- (Figure 1) --.

At column 3, line 46, after "other" please delete "and" and insert -- . The valve is --, therefor.

At column 3, line 67, before "by a throttle" please insert -- (Figure 1) --.

At column 4, lines 10-11, after "embodiment" please delete "will be made next." and insert -- are set forth below. --, therefor.

At column 4, line 25, after "are" please delete "read." and insert -- read (Steps S9 to S11). --, therefor.

At column 4, line 53, please delete "Specifically," and insert -- With reference to Steps S14 and S19, --, therefor.

At column 4, lines 62-63, after "lean" please delete "signal." and insert -- signal (Steps S34 to S36). --, therefor.

UNITED STATES PATENT AND TRADEMARK OFFICE
CERTIFICATE OF CORRECTION

| | |
|---|---|
| PATENT NO. | : 6,945,231 B2 |
| APPLICATION NO. | : 10/149895 |
| DATED | : September 20, 2005 |
| INVENTOR(S) | : Yoshikatsu Iida |

It is certified that error appears in the above-identified patent and that said Letters Patent is hereby corrected as shown below:

At column 5, line 5, please delete "Specifically," and insert -- With reference to Step S21, --, therefor.

At column 5, line 60, after "from" please delete "being a" and insert -- causing --, therefor.

At column 5, line 60, after "resistance" please delete "to" and insert -- against --, therefor.

At column 6, line 2, please delete "accurately" and insert -- accurately --, therefor.

At column 6, lines 5-6, after "controlled" please delete "to draw" and insert -- in accordance with --, therefor.

At column 6, line 6, after "curve" please delete "like the" and insert -- such as --, therefor.

At column 6, line 11, before "a second" please delete "FIG. 8 to FIG. 12 are views for explaining" and insert -- FIGS. 8 to 12 illustrate --, therefor.

At column 6, line 13, after "as in" please delete "FIG. 1 to FIG. 7." and insert -- FIGS. 1 to 7. --, therefor.

At column 6, line 21, after "embodiment" please delete "will be" and insert -- are --, therefor.

At column 6, line 22, after "described" please delete "by" and insert -- with reference to the --, therefor.

UNITED STATES PATENT AND TRADEMARK OFFICE
CERTIFICATE OF CORRECTION

| | |
|---|---|
| PATENT NO. | : 6,945,231 B2 |
| APPLICATION NO. | : 10/149895 |
| DATED | : September 20, 2005 |
| INVENTOR(S) | : Yoshikatsu Iida |

It is certified that error appears in the above-identified patent and that said Letters Patent is hereby corrected as shown below:

At column 6, line 22, after "shown in" please delete "FIG. 10 and FIG. 11." and insert -- FIGS. 10 and 11. --, therefor.

At column 7, line 3, before "the A/F" please delete "Specifically," and insert -- With reference to Steps S14 and S19 (Fig. 10), --, therefor.

At column 7, line 22, before "the deceleration" please delete "Specifically," and please insert -- With reference to Step S21 (Fig. 10), --, therefor.

At column 7, line 52, after "can" please delete "arbitrarily".

At column 7, line 56, after "can" please delete "arbitrarily".

At column 7, line 66, before "a fuel" please delete "According to the invention of Claim 1, since" and insert -- Since --, therefor.

At column 8, line 14, after "with a" please insert -- more --.

At column 8, line 25, before "the fuel gas" please delete "According to the invention of Claim 2, since" and insert -- By connecting --, therefor.

At column 8, line 26, after "valve" please delete "is connected".

At column 8, line 38, before "the air" please delete "According to the invention of claim 3, since" and insert -- Additionally, by connecting --, therefor.

At column 8, line 39, after "passage" please delete "is connected".

UNITED STATES PATENT AND TRADEMARK OFFICE
CERTIFICATE OF CORRECTION

PATENT NO. : 6,945,231 B2
APPLICATION NO. : 10/149895
DATED : September 20, 2005
INVENTOR(S) : Yoshikatsu Iida It is certified that error appears in the above-identified patent and that said Letters Patent is hereby corrected as shown below:

At column 8, lines 43-45, before "the opening" please delete "According to the invention of Claim 4, since the fuel gas control valve is opened and closed by a step motor," and insert -- Further, by using a step motor to open and close the fuel gas control valve, --, therefor.

At column 8, lines 46-47, after "accuracy." please delete "Especially, as in the invention of Claim 5," and insert -- Additionally, --, therefor.

At column 8, line 53, below "invention." please insert -- Various changes and modifications may be made to the above-described arrangements without departing from the spirit and scope of the invention, as defined by the appended claims. --.

Signed and Sealed this

Thirteenth Day of May, 2008

JON W. DUDAS
*Director of the United States Patent and Trademark Office*